Patented Aug. 16, 1932

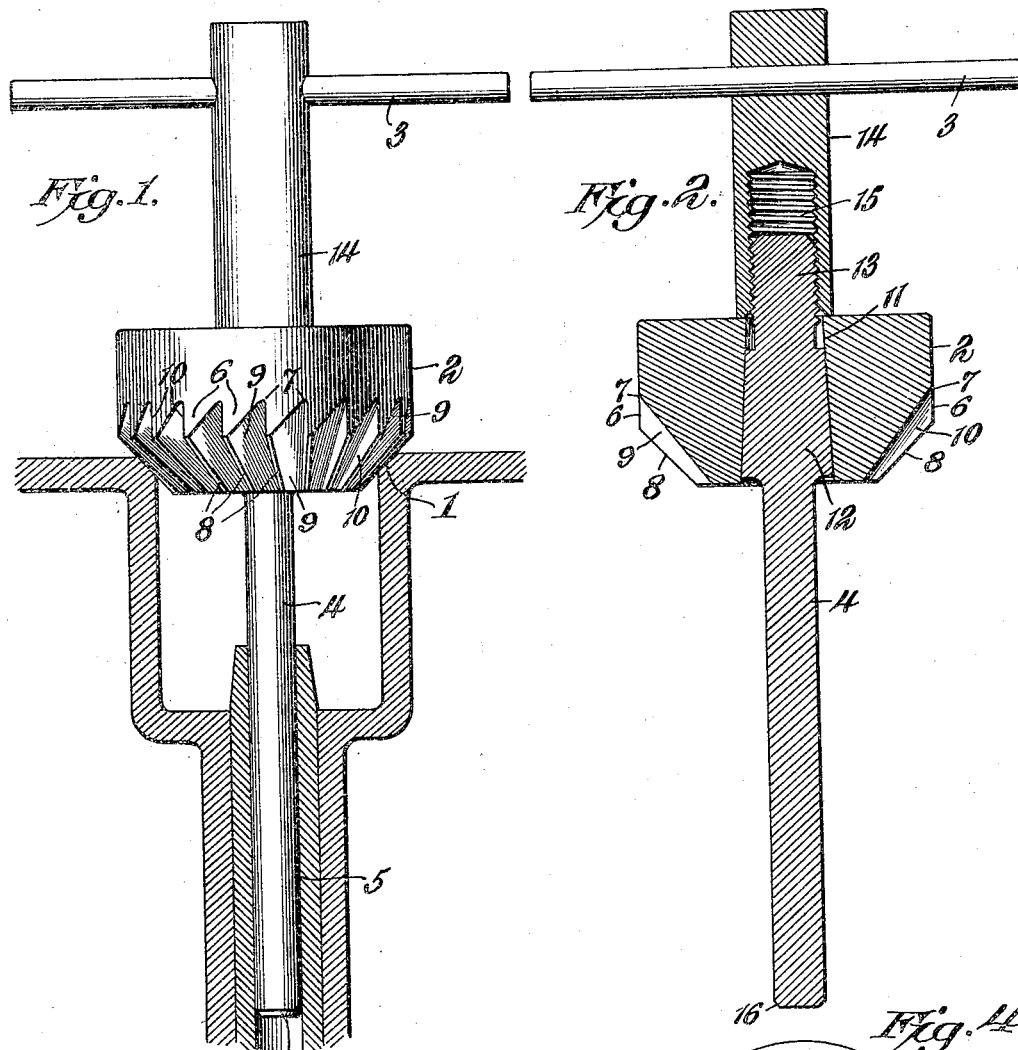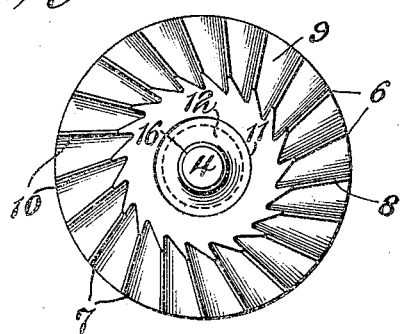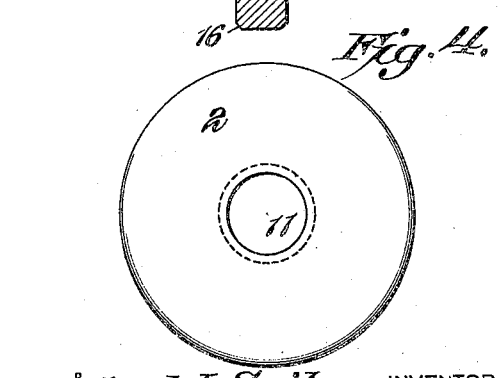

1,871,474

UNITED STATES PATENT OFFICE

MICHAEL I. SEILER, OF MILLERSBURG, PENNSYLVANIA, ASSIGNOR TO KEYSTONE REAMER & TOOL CO., OF MILLERSBURG, PENNSYLVANIA, A CORPORATION OF PENNSYLVANIA

REAMER

Application filed November 10, 1927. Serial No. 232,408.

This invention relates to reamers and among other objects, aims to provide a reamer which may be easily and cheaply manufactured and having straight cutting flutes or teeth which will produce the much desired shear cut without chattering, and without entering so deeply in the work as to remove too big a "bite", either of which prevents accurately finished reaming.

In the accompanying drawing, in which the preferred embodiment of the invention is illustrated:—

Fig. 1 is a side elevation of the improved reamer shown in position for reaming the valve seat of an automobile engine.

Fig. 2 is a vertical, longitudinal section through the tool.

Fig. 3 is a detail plan view of the active end of the reamer.

Fig. 4 is a top plan view of the reamer head.

Heretofore, straight bladed reamers were subject to a number of drawbacks, among which was chattering during the reaming process, brought about by the straight, radially-disposed teeth entering too far into the work under the pressure exerted by the operator. In the case of spiral bladed reamers, the inherent objections reside in the fact that such blades tend to draw themselves too rapidly into the work, as a result of which chattering and perhaps stalling of the reamer may take place. Furthermore, the course necessarily pursued in the manufacture of a spiral bladed reamer, entailing the use of a milling machine and the consequent accurate turning of the work synchronously with the advance of the milling cutter, renders the operation prohibitively expensive for the production of reamers.

To obviate these disadvantages, the present invention provides a reamer which may be used for various work, having specially designed flutes or teeth which may be easily, quickly and cheaply produced by the operations of an ordinary shaper or by simple milling operations.

Referring more particularly to the drawing, see Fig. 1, the illustrative reamer is shown as being applied to a valve seat 1 which is generally formed on a 45° angle, however, it is capable of many other uses. Whether the valve seat is on a new motor or is a worn seat of an old motor requiring grinding or refacing, the usual operation is to turn manually therein a reamer or grinding tool approximately fitting the opening and corresponding in angularity to the valve to be seated.

The preferred embodiment has a head 2, constituting the reaming head of the tool, which is of somewhat greater diameter than the diameter of the valve seat 1 and is adapted to be rotated in one direction by means of a handle 3, or its mechanical equivalent. The tool may also be rotated by power.

In order to secure the utmost accuracy during the turning of the device and to produce the best results when reaming valve seats, the tool must be held and guided so as to be rotated about a fixed axis of rotation and for this purpose a pilot 4 is provided which may be easily inserted into the bushing 5 for the valve stem, after the latter has been removed from its seat, as shown. By the provision of the pilot, considerable pressure may be exerted upon the tool during its rotary cutting movement, without danger of dislodging the same from its proper, accurate position in the seat 1.

The active end of the head 2, which herein is the lower end, is of frusto-conical form having the desired angularity as that of the valve seat, and is provided with a continuous series of cutting flutes or teeth 6 produced by cutting a continuous series of straight grooves in the metal in a manner which may be easily accomplished by the use of a shaping machine or straight milling operations, without the necessity of turning the work. The circular head 2 is held in the shaper in such a position that the cutting tool thereof will produce an angular cut with respect to the head, as shown in Fig. 3, the grooves formed by such cuts being perfectly straight throughout their lengths and being deeper at their outer or upper ends 7 than at their lower ends (Fig. 2) and extending through the circumferential wall of the head 2 and through the flat bottom wall thereof.

Each tooth is provided with a straight, relieved cutting edge 8 which is shown as lying in a plane which intersects the axial plane at an acute angle, whereby the edge, when in operation, cuts the metal at a slant or angle to the direction of rotation and produces a shear cut without chattering. The angularity of teeth should be at least 15° to produce smooth cuts. This is further enhanced by providing an odd number of teeth around the periphery of the head, as shown, thus disposing each tooth diametrically opposite to a groove. However, an even number of teeth may be employed.

One wall 9 of each tooth is inclined, said wall constituting the rear wall of the tooth, the same following during the rotation of the reamer. The other or front wall 10 is shown as being approximately perpendicular to the work and constitutes the active face of the tooth. However, the face may be slightly undercut to produce a sharper cutting edge.

It is desirable to change the reamer head at times for others of larger or smaller diameters or of different angularity and, for convenience, means have been provided for using the same handle and pilot for different sized reamers. To this end the reamer head 2 is provided with a tapered bore or passageway 11 (Fig. 2) extending longitudinally therethrough, the same being larger in diameter at the active end of the head than at the other end thereof, and adapted to receive the conical enlargement 12 forming part of the pilot bar 4. The size of the enlargement is such as to wedge in the bore or passageway 11 of the reamer before the upper end of the same reaches the upper end of the bore, as clearly shown.

The upper end of the pilot bar is threaded, as at 13, and extends above the top of the reamer head 2 for the reception of a sleeve or nut 14, forming part of the handle 3, the same having an interiorly-threaded socket 15 adapted to engage the upper end of the pilot and, by turning said nut, with the lower end of the same bearing upon the head 2, draw the conical enlargement into the bore to produce a frictional engagement ample to force the reamer to turn with the handle. This arrangement also permits the reamer to be removed very easily, by unscrewing the sleeve and tapping the threaded end of the pilot while holding the tool upside down so that the pilot will not be injured.

When the parts are assembled great pressure may be brought to bear on the reamer to grind or regrind a valve seat or similar opening, the cutting teeth having an angularity of about fifteen degrees relative to a perpendicular to the surface of the work, serving to remove the metal while having a tendency to back out of the work at the same time.

It will be seen that the straight, angularly-disposed cutting teeth may be produced by simple process on a shaping machine thus considerably reducing the cost of production of tools of this class. It will be clear that, by the provision of the interchangeable turning means, a convenient and handy tool of adequate strength and durability has been provided.

Obviously the present invention is not restricted to the particular embodiment thereof herein shown and described.

What is claimed is:—

1. A valve reseating tool comprising a guide rod threaded adjacent one end and having a slightly tapered enlargement converging toward said threaded portion, a rotary cutter having a bore fitting said enlargement and seating thereupon, said cutter consisting of a block having a tapering tool portion and a cylindrical body portion of sufficient length to materially increase the inertia of the cutter, and operating means screwing upon the threaded portion of said guide rod and engaging said cutter to lock the same to said guide rod through frictional pressure between the coacting tapered surfaces of said bore and enlargement.

2. A valve reseating tool comprising a pilot threaded at its upper end and having a slightly tapered enlargement below said threaded portion, a rotary cutter having a tapered bore fitting said enlargement and seated thereupon, said cutter consisting of a block of substantial length having a tapered bladed portion, and an operating handle screwing upon the threaded upper end of said pilot and engaging said cutter to lock the same to said pilot by frictional engagement between the coacting tapered surfaces of said bore and enlargement.

In testimony, that I claim the foregoing as my own, I have hereto affixed my signature.

MICHAEL I. SEILER.